US008998285B2

(12) United States Patent
Bethel, Jr.

(10) Patent No.: US 8,998,285 B2
(45) Date of Patent: Apr. 7, 2015

(54) DUMP TRUCK TAILGATE DEBRIS BIN (71) Applicant: James A. Bethel, Jr., Capitol Heights, MD (US)

(72) Inventor: James A. Bethel, Jr., Capitol Heights, MD (US)

( * ) Notice: Subject to any disclaimer, the term of this patent is extended or adjusted under 35 U.S.C. 154(b) by 0 days.

(21) Appl. No.: 13/966,968

(22) Filed: Aug. 14, 2013

(65) Prior Publication Data

US 2015/0048128 A1    Feb. 19, 2015

(51) Int. Cl.
*B60P 1/04*    (2006.01)
*B60R 9/06*    (2006.01)

(52) U.S. Cl.
CPC .... *B60R 9/06* (2013.01); *B60P 1/04* (2013.01)

(58) Field of Classification Search
CPC .......... B60P 1/04; B60P 1/28; B62D 33/023; B62D 33/027; B62D 33/0273
USPC ................ 296/37.6, 38, 182.1, 183.1, 183.2; 224/488, 511, 538; 298/7, 23 R; 222/108
See application file for complete search history.

(56) References Cited

U.S. PATENT DOCUMENTS

| | | | | |
|---|---|---|---|---|
| 1,586,532 A * | 6/1926 | Pampinella | ................... | 296/57.1 |
| 2,679,335 A * | 5/1954 | Bell | .............................. | 222/108 |
| 2,682,975 A * | 7/1954 | Stoner | ........................... | 222/108 |
| 3,366,418 A * | 1/1968 | Lackey | ............................ | 298/7 |
| 4,772,072 A | 9/1988 | Vick, Jr. | | |
| 5,046,774 A | 9/1991 | Stockell et al. | | |
| D480,333 S | 10/2003 | Allison | | |
| 6,929,329 B2 * | 8/2005 | Kent et al. | ......................... | 298/7 |
| 7,731,297 B1 | 6/2010 | Ozanich | | |
| 2012/0007382 A1 | 1/2012 | Keck et al. | | |
| 2014/0110989 A1 * | 4/2014 | McKinley | ................... | 298/23 R |

* cited by examiner

*Primary Examiner* — Glenn Dayoan
*Assistant Examiner* — Jason S Daniels
(74) *Attorney, Agent, or Firm* — Benjamin M. Hanrahan; Hanrahan Law Firm, P.A.

(57) ABSTRACT

A tailgate debris catching assembly for a vehicle is presented herein. Particularly, the assembly includes at least one, but in some cases, a plurality of at least two, vehicle attachment assemblies securely attached to the vehicle, for example, on the sides of the vehicle at or near the rear. A debris receptacle or bin including an open top portion and an inner receiving area is connected to or otherwise attached to the vehicle attachment assemblies and positioned in a manner to receive and at least temporarily retain debris fallen from the vehicle and through the open top portion of the debris receptacle. Accordingly, the debris receptacle may include at least one, but in some cases, a plurality of at least two, receptacle attachment members, which are capable of being securely and removably attached to the correspondingly structured and disposed vehicle attachment assemblies.

13 Claims, 6 Drawing Sheets

DUMP TRUCK TAILGATE DEBRIS BIN

FIELD OF THE INVENTION

The present invention is generally directed to a debris bin and/or receptacle assembly that can be attached (removably or fixedly) to the rear portion of a vehicle, and in particular, a dump truck, and catch or at least temporarily retain debris, including, for example, rocks, pebbles, gravel, dirt, leaves, branches, or other loose materials, that may fall from or inadvertently escape the rear of the vehicle.

BACKGROUND OF THE INVENTION

Oftentimes, various vehicles, whether commercial, construction, private, government vehicles, etc., and in particular, dump trucks, carry or transport goods or materials from one location to another, for example, in a rear bed or rear portion of the vehicle. As just an example, the materials may be construction type materials, such as large or small rocks, gravel, dirt, sand, etc., landscaping materials, such as trees, limbs, branches, sod pallets, wood chips, etc., or any other type of goods or materials, whether large, small, heavy or lightweight.

Particularly, the various goods or materials (or a portion thereof) may become loose, dislodged or otherwise fall from the vehicle causing a dangerous condition on the road for other vehicles. For exemplary purposes only, trucks, including but not limited to dump trucks, oftentimes have a hinged or flap tail gate which can open at a lower end in order to dump the transported materials (e.g., rocks, gravel, dirt, sand, etc.) at the designated location. Specifically, the tailgate may pivot at a top end, causing the lower end to open and expose the materials therein.

When driving or travelling from one location to another with a load of materials in the truck or vehicle, the materials (or a portion of the materials) may become dislodged or otherwise inadvertently fall from the truck and onto the surface of the road. Obviously, the fallen debris, whether large rocks, tree limbs, branches, gravel, dirt, sand, etc., can cause a dangerous condition for other vehicles travelling behind the truck and on the same road. It should also be noted that debris may fall from the vehicle at any time, and not just when the vehicle is moving or travelling from one location to another.

Accordingly, there is a need in the art for a debris receptacle attached or connected to the rear of the truck, for example proximate the lower open end of the tailgate, and structured to receive and temporarily retain fallen debris therein while the truck or vehicle is moving or stationary. The proposed debris receptacle may be removably attached to the vehicle, for instance, via attachment assemblies and attachment members, in order to easily position the receptacle in its operative debris receiving location when needed or when desired. The attachment assemblies should securely lock the receptacle in place and allow the receptacle to maintain in its operative position even while the vehicle travels at low or high speeds in excess of 70 miles per hour, for example. Other embodiments contemplate a fixed attachment of the receptacle to the truck or vehicle, and may, in certain cases, pivot or otherwise be positionable between a debris receiving orientation and non-operative orientation allowing the vehicle to dump the materials.

SUMMARY OF THE INVENTION

The present invention is generally directed to a tailgate debris catching assembly attached to the rear portion of a vehicle, and in certain, embodiments, a dump truck, in order to catch and at least temporarily retain debris, such as rock, gravel, etc. that may fall from the truck bed or tailgate, for example, while driving or stationary. Particularly, the assembly of the present invention comprises at least one, but more practically, plurality of at least two vehicle attachment assemblies which are securely attached to or otherwise constructed as part of the truck and disposed at opposite ends of a rear portion of the truck.

Furthermore, the assembly include a debris receptacle or bin which has an open top portion and an inner receiving area. The open top portion of the receptacle or bin is operatively disposed proximate and preferably just below a lower portion of the dump truck tailgate. Particularly, a dump truck tailgate generally includes a lower portion or end that opens, for example, when the truck dumps the materials. Certain debris, such as rocks, gravel, etc. can inadvertently fall from the truck and through the open end, especially when the truck is driving or transporting materials from one location to another. Accordingly, the receptacle of one embodiment is positioned just below the open portion or end of the tailgate and structured to collect or receive fallen debris therefrom.

In at least one embodiment, the receptacle includes two attachment members or arms that extend out from the bin portion and into a fitting engagement or connection with the vehicle attachment assemblies, previously discussed. Certain embodiments allow the attachment members to be removably secured to the truck or vehicle attachment assemblies in a manner such that the receptacle can be easily removed, for example, when the truck dumps the material in the selected or designated location. In other embodiments, however, the receptacle can be securely attached to the vehicle and pivoted, moved or extended out of the way (for example, up and above the open end of the tailgate) to allow the truck to dump the materials.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
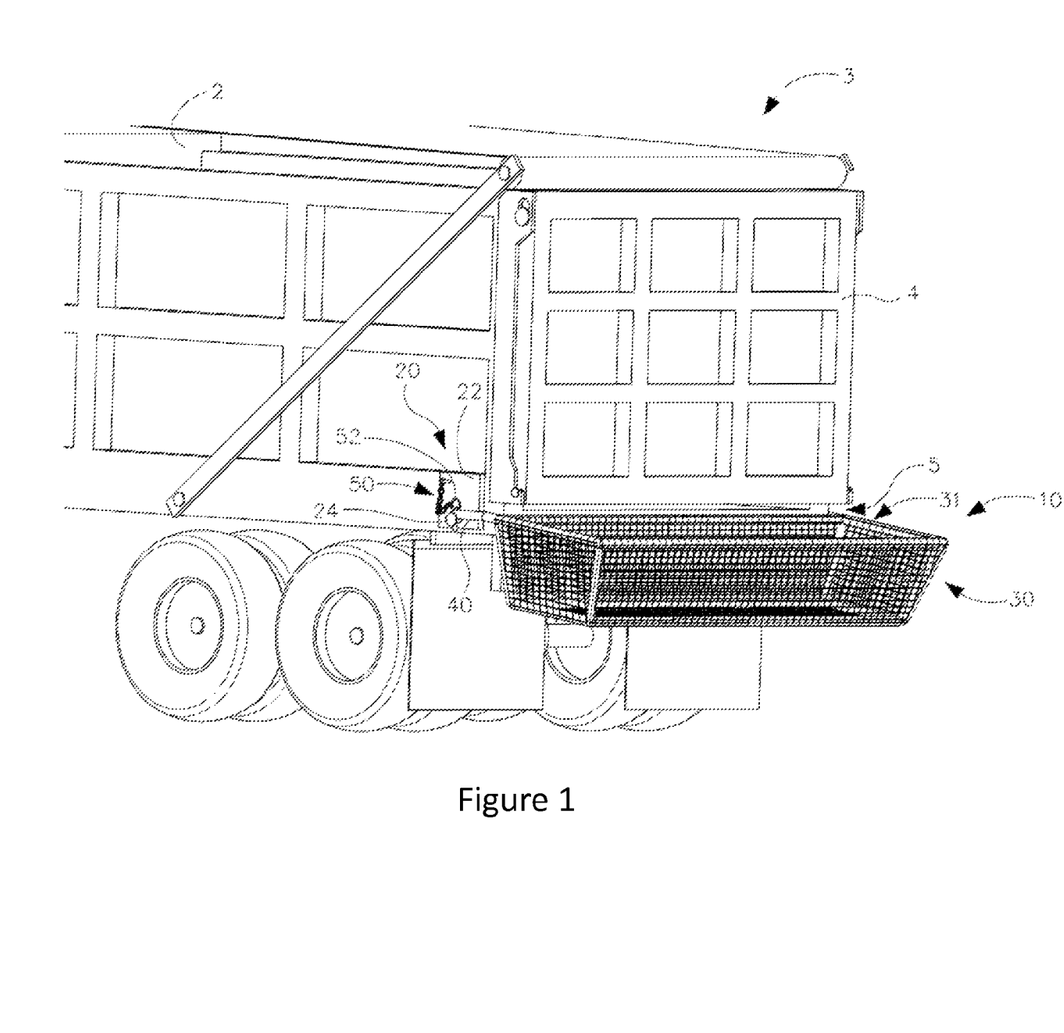
FIG. 1 is a left perspective view of at least one embodiment of the receptacle assembly disclosed herein and attached to the rear portion of a vehicle or dump truck.
Figure 2:
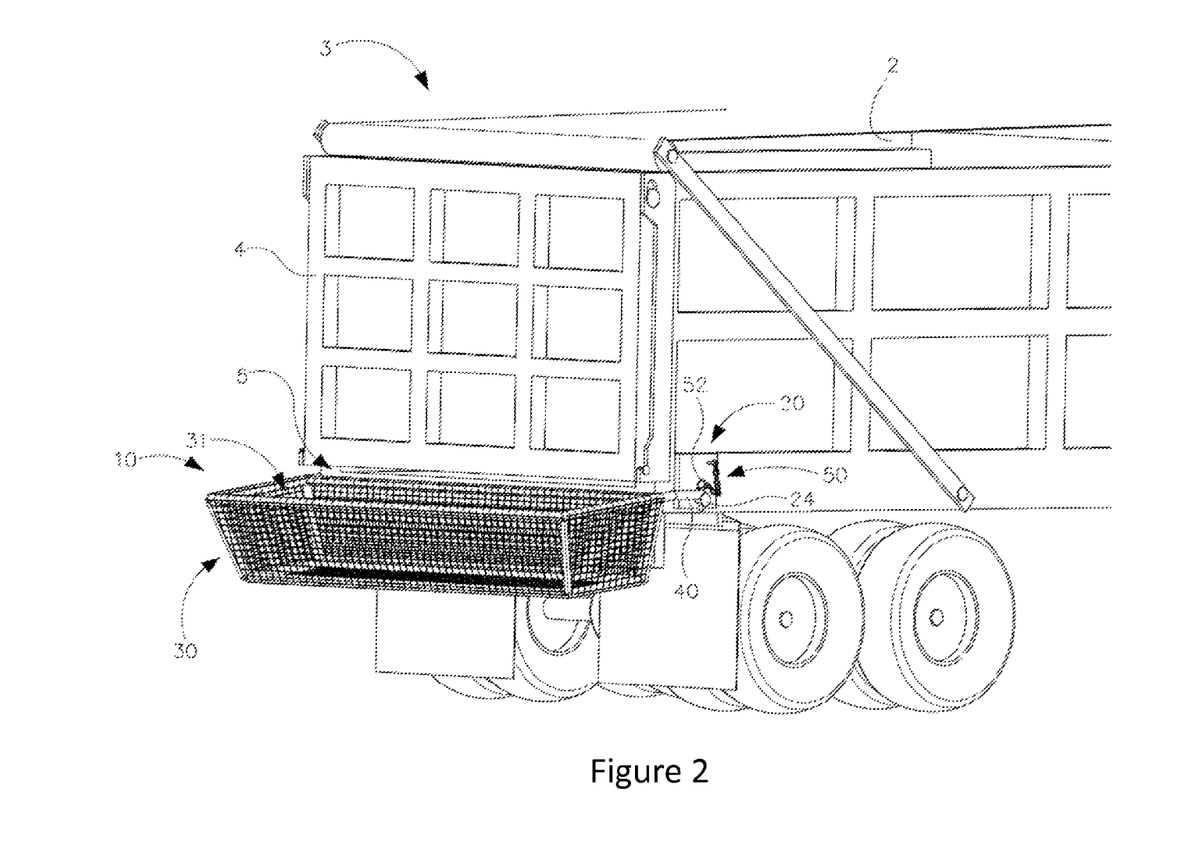
FIG. 2 is a right perspective view of the embodiment illustrated in FIG. 1.

As shown in the figures, and with particular reference to FIGS. 1 and 2, the present invention is directed to a debris catching assembly, referenced as 10, attached to a vehicle 2, including, but not necessarily limited to, a dump truck as shown in the figures. Specifically, various vehicles, whether commercial, construction, private, government vehicles, etc. carry or transport goods or materials that may become dislodged or fall from the vehicle 2 causing a dangerous condition on the road for other vehicles. For exemplary purposes only, trucks, including but not limited to dump trucks, oftentimes have a hinged or flap tail gate 4 which opens at a lower end 5 thereof to dump the materials (e.g., rocks, gravel, dirt, sand, etc.) at the designated location. When driving or travelling from one location to another with a load of material in the truck, however, the material may become loose, dislodged and/or otherwise fall through the lower end 5 of the tailgate 4 and become debris that can cause a dangerous condition on the road or other location.

Accordingly, at least one embodiment of the debris catching assembly 10 of the present invention may be installed or positioned on the rear of the vehicle 2 while the vehicle 2 is travelling or moving from one location to another. As will become apparent from the discussion herein, the assembly 10 is structured and disposed to catch, receive and at least temporarily retain the falling debris from the vehicle 2. It should be noted, however, that the assembly 10 may be used when the vehicle 2 is stationary, and thus, the vehicle 2 need not be moving or travelling for the present invention to be used.

Still referring to FIGS. 1 and 2, at least one embodiment of the present invention includes a vehicle attachment assembly 20 attached, secured to, or part of the vehicle 2. Particularly, in one embodiment, two vehicle attachment assemblies 20 are used and secured to opposite ends of a rear portion 3 of the vehicle 2. For instance, as illustrated in the exemplary embodiment of FIGS. 1 and 2, the vehicle attachment assemblies 20 are secured to opposite sides of the vehicle 2 at or near the rear portion 3 of the vehicle 2 in order to operatively dispose the assembly 10 proximate an opening 5 of the tailgate 4 which may release loose debris.

In certain embodiments, the vehicle attachment assembly 20 may include a generally rigid and sturdy construction, and may, but need not, be constructed of metal, aluminum, steel, or other strong or sturdy material structured to at least partially support the assembly 10 and to facilitate practice of the present invention in the intended manner. It should also be noted that the vehicle attachment assembly 20 may be removably or fixedly attached to the vehicle 2 in any number of ways, including via a removable, permanent or semi-permanent attachment structure (not shown) such as screws, bolts, rivets, welding, etc. Accordingly, the vehicle attachment assemblies 20 may be retro-fitted or attached to existing vehicles, if desired. In other embodiments, however, the vehicle attachment assembly 20 may be constructed as part of the vehicle 2.

Furthermore, in at least one embodiment, the vehicle attachment assembly 20 includes a base 22 or plate, which is secured or attached to the vehicle 2, for example, in the manner discussed previously. Still referring to FIGS. 1 and 2, the vehicle attachment assembly 20 may also include at least one extension member, protruding member or attachment device 24, for example, extending at least partially out from the base 22 and/or away from the vehicle 2. As will be discussed herein, a debris receptacle 30 may be attached or connected to the protruding member 24 of the vehicle attachment assembly 20 in order to operatively position the receptacle 30 in a debris receiving relation relative to the vehicle 2.

Particularly, the assembly 10 of the various embodiments disclosed herein includes a debris receptacle 30 which is cooperatively structured and disposed to receive and at least temporarily retain loose debris or other material or objects falling from or exiting the vehicle 2, for example, via the open end 5 of the tailgate 4. As illustrated, the debris receptacle 30 of at least one embodiment comprises an open top portion 31 and an inner receiving area 32. Accordingly, debris or other material or objects falling from or exiting the rear portion of the vehicle 2, for example, via the tailgate 4, will fall through the open top portion 31 of the debris receptacle and into the inner receiving area 32 thereof.

Furthermore, the debris receptacle 30 of at least one embodiment, also includes an attachment member 40, and in certain embodiments, as illustrated, two attachment members 40 each of which securely attach to a corresponding one of the vehicle attachment assemblies 20. Particularly, in certain embodiments, the receptacle attachment members 40 are structured for a removable attachment or connection with the corresponding vehicle attachment assemblies 20. In this manner, the debris receptacle 30 may be selectively removed from the rear of the vehicle 2, for example, when the vehicle 2 is ready to dump the material at the designated location. Other embodiments may allow for the debris receptacle 30 to be moved out of the way rather than completely removed and disconnected from the vehicle 2 or vehicle attachment assemblies 20. For example, in such an embodiment, the debris receptacle 30 may pivot downward, upward, or off to the side in a manner to allow the materials from the truck to exit in the normal fashion.

Accordingly, the debris receptacle 30, of at least one embodiment, may pivot upward and onto the tailgate 4 or above the tailgate 4 allowing the materials to be dumped through the tailgate 4 and in particular the lower opening 5 thereof. In such an embodiment, the debris receptacle 30 may include extension arms or supports that extend in length (e.g., telescopically) allowing the receptacle attachment members 40 to remain attached to the vehicle attachment assemblies 20 as the debris receptacle 30 is pivoted or moved upward, downward, or otherwise out of the way.

Other embodiments are structured for a removable attachment between the debris receptacle 30 (and in particular, the receptacle attachment members 40) and the vehicle attachment assemblies 20. In this regard, the debris receptacle 30 may be selectively removed from and attached to the vehicle 2, as desired or needed.

For example, the receptacle attachment member(s) 40 of at least one embodiment comprises an end portion and/or engagement portion 42 which is cooperatively structured for a fitted engagement with the extension or protruding member 24 of the vehicle attachment assembly 20. Specifically, the end or engagement portion 42 of the receptacle attachment member 40 may comprise a receiving portion 43, for example, a hooking or coupling structure that is configured to at least partially wrap around or overlay the protruding member 24 of the vehicle attachment assembly 20 in a fitted engagement. Various configurations of the cooperatively constructed protruding member(s) 24 and engagement potions 42 or receiving portion 43 are contemplated, such as the curved or rounded hook-like configuration shown in the figures, as well as more angled, box-like configurations structured to facilitate a tight fitted engagement there between. It should also be noted that in certain embodiments the end or engagement portion 42 of the receptacle attachment member 40 may be inserted into (or otherwise connected to) a receiving portion (or hole) of the vehicle attachment assembly 20, for example, on or in the protruding member 24, or other portion of the vehicle attachment assembly 20, in order to accomplish the fitted engagement there between. For instance, the vehicle attachment assembly 20 may include a fitted channel, hole or other attachment mechanism for connecting the receptacle attachment member 40 thereto.

Moreover, at least one embodiment of the present invention further comprises a locking assembly 50 disposable in a removably locking engagement with the receptacle attachment member 40 and the vehicle attachment assembly 20. Particularly, the locking assembly 50 is structured and disposed to lockingly engage the receptacle attachment member 40 to the vehicle attachment assembly 20 in order to prevent or minimize dislodgment or a disconnection there between, for example, while the vehicle is travelling or moving. Various locking assemblies may be used and contemplated within the full spirit and scope of the present invention to achieve the locking engagement between the receptacle attachment member 40 and the vehicle attachment assembly 20.

In at least one embodiment, however, as illustrated in FIGS. 1, 2, 3, 4 and 6 the locking assembly comprises one or more locking members 52 disposable into a correspondingly structured locking channel 55 to restrict inadvertent disconnection between the debris receptacle 30 and the vehicle attachment assemblies 20. The locking member 52, of at least one embodiment, may comprise a pin or other generally rigid and elongated member structured to fit at least partially within the locking channel 55, and to restrict inadvertent removal or disconnection between the debris receptacle 30 and the vehicle attachment assembly 20. The locking member 52 may include an enlarged head portion, end portion and/or or other blocking portion structured to restrict movement of the locking member completely though the locking channel 55 of at least one embodiment. Specifically, the locking member 52 is structured to remain in the locked position or otherwise within the locking channel 55 until manually removed therefrom.

Particularly, the locking channel 55 of at least one embodiment of the present invention may be defined by cooperatively structured and aligned apertures, holes or channels 25, 45 disposed on the vehicle attachment assembly 20 and the receptacle attachment member 40, respectively. For example, the protruding member 24 of the vehicle attachment assembly 20 of at least one embodiment comprises a receiving hole, aperture or channel 25 disposed at least partially, and in one embodiment completely, there through. Similarly, the end portion or engagement portion(s) 42 of the receptacle attachment member 40 may comprise one or more receiving holes, apertures or channels 45 that is disposable in an aligned relation with the receiving hole, aperture or channel 25 of the protruding member 24 in order to define the locking channel 55.

Accordingly, in order to dispose the debris receptacle 30 into a locked position on the vehicle 2 of at least one embodiment, the receptacle attachment members 40, and in particular, the outer ends or engagement portion(s) 42 thereof, are disposed in an overlying and at least partially wrapped and fitted engagement with the protruding portion 24 of the vehicle attachment assemblies 20. As discussed herein, the vehicle attachment assemblies 20 of at least one embodiment are secured or attached to opposite sides of the rear portion 3 of the vehicle 2. Further, the receiving channels or holes 45, 25 on the receptacle attachment members 40 and vehicle attachment assemblies 20, respectively, are aligned with one another to define the locking channel 55. The locking pin or locking member 52 is then disposed at least partially within the locking channel 55 in order to restrict inadvertent removal or disconnection between the debris receptacle 30 and the vehicle attachment assemblies 20.

In order to remove the debris receptacle 30 of at least one embodiment from the vehicle 2, for example, in order for the dump truck to unload the materials, the locking member 52 is removed from the locking channel 55. It should be noted that certain embodiments further include a retention member 56 for retaining the locking member 52 in a connected relation with the vehicle attachment assembly 20. Accordingly, the retention member 56 may include a chain, rope, or other generally flexible and maneuverable member connected between the locking member 52 and the vehicle attachment assembly 20, for example, the base 22. Once the locking member 52 or locking assembly 50 is disengaged or removed from the locking channel 55, the receptacle attachment members 40 may be removed from the vehicle attachment assemblies 20 in order to remove the receptacle 30 therefrom.

Figure 6:
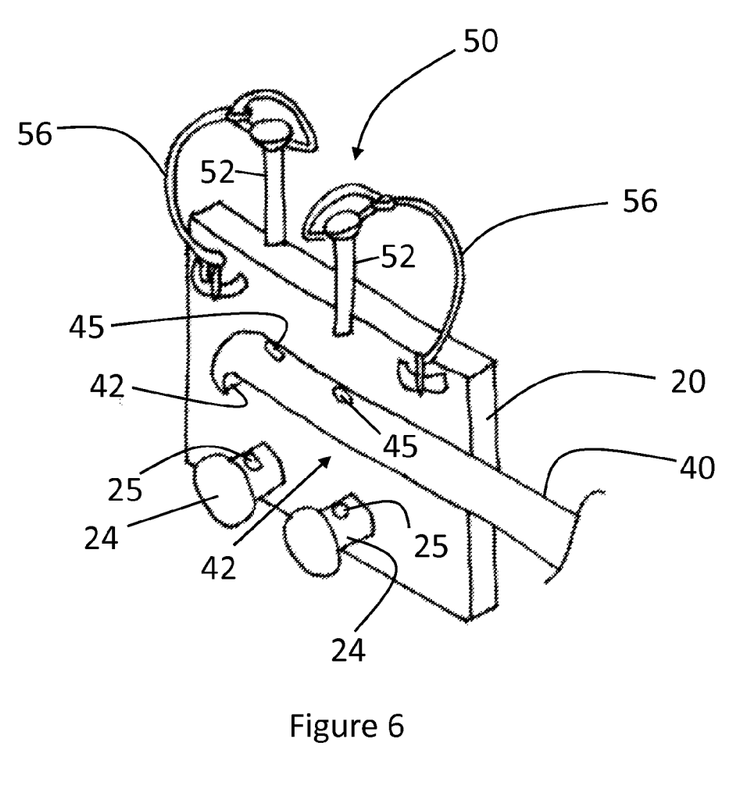
FIG. 6 is an exploded view of yet another embodiment of the receptacle attachment member, vehicle attachment assembly and locking assembly as disclosed herein.

It should be noted that in at least one embodiment, as generally illustrated in FIG. 6, the locking assembly 50 may comprise a plurality of at least two spaced apart locking pins or locking members 52 engaged in a locking relation with a common attachment member 40 and a corresponding one of the vehicle attachment assemblies 20. Particularly, a single vehicle attachment assembly 20 of such an embodiment may include two or more protruding members 24 and corresponding channels or apertures 25. Similarly, a single attachment member 40 may include spaced apart apertures or channels 45 disposable in an aligned relation relative to the apertures 25 of the vehicle attachment assembly 20. Furthermore, the attachment member 40 may also include correspondingly positioned engagement portions structured to be fittingly engaged with the corresponding protruding portion 24. As an example, the engagement portions 42 may include curved or slightly rounded configurations structured to fit or overly the protruding portion 24. Other configurations are contemplated and within the full spirit and scope of the present invention including, for example, angled, square or other fitted engagement configurations.

Accordingly, the dual locking assembly 50 as illustrated in FIG. 6 comprising a plurality of successive or spaced apart locking members 52 are structured to provide added stability and strength to the assembly of the present invention, particularly when the vehicle 2 is moving or driving. Specifically, the dual locking assembly 50 illustrated in FIG. 6 is structured to prevent, minimize or restrict movement or vibrations of the receptacle during transportation, or otherwise while the vehicle is travelling from one location to another.

Figure 3:
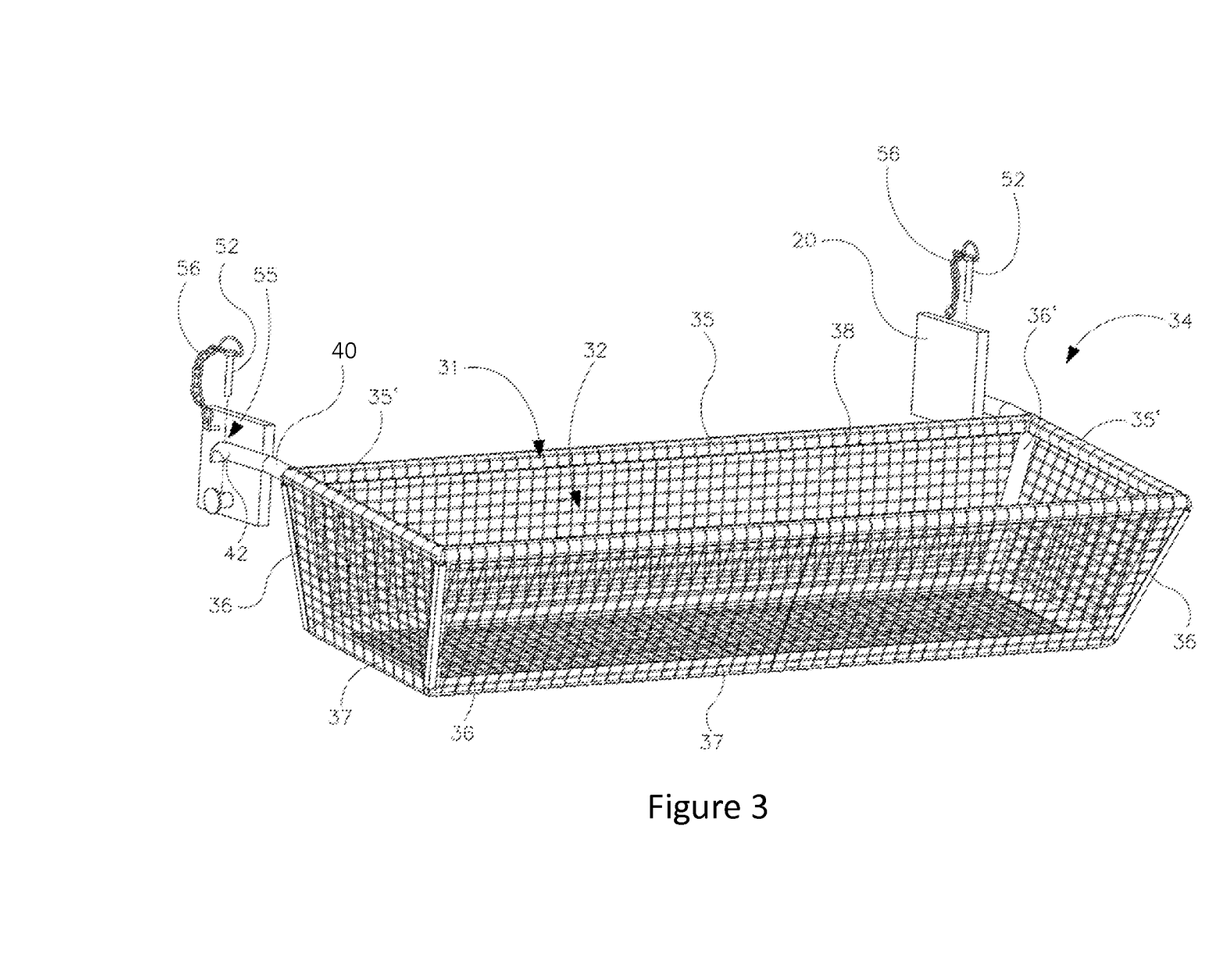
FIG. 3 is a perspective partially exploded view of the receptacle attachment members, vehicle attachment assemblies and locking assemblies as disclosed in accordance with at least one embodiment of the present invention.

Referring to FIG. 3, the debris receptacle 30 of at least one embodiment comprises a frame assembly 34 comprising top frame members 35, 35', side frame members 36, 36' and bottom frame members 37. The frame assembly 34 and/or frame members 35, 36, 37 thereof may be constructed of a generally sturdy and rigid material, including, but in no way limited to a lightweight aluminum, wood, steel, plastic, etc. Also, as illustrated, the receptacle attachment members 40 may be constructed as part of, and an extension of, or attachment to lateral top frame members 35'. In this regard, the lateral upper or top frame members 35' may extend beyond the rear side frame members 36' in order to attach to the vehicle attachment assemblies 20 as described herein.

Furthermore, a receptacle member 38 is connected to the frame assembly 34 in order to define the inner receiving area 32 and open top portion 31. For instance, as illustrated, the receptacle member 38 may comprise a mesh material wrapped at least partially around or connected to the bottom and side portions of the frame assembly 34 in order to create the bin receptacle thereof and in particular the inner receiving area 32 and open top portion 31. Particularly, the receptacle member 38 may include, but is not limited to, a net, mesh, or other like material structured to hold and maintain at least temporarily the debris therein. For instance, if the receptacle 30 is structured to retain small gravel, then the mesh or net openings of the member 38 will be dimensioned smaller than the gravel such that the gravel or other material will remain in the receptacle 30 and not fall through to the ground or road. Accordingly, the member 38 need not be a mesh or net like material, and may instead be a solid piece of fabric structured to retain even small granules such as dirt and sand. In other embodiments, the member 38 may include a more rigid construction such as, but not limited to, sheet metal or thin aluminum, plastic, etc.

Figure 5:
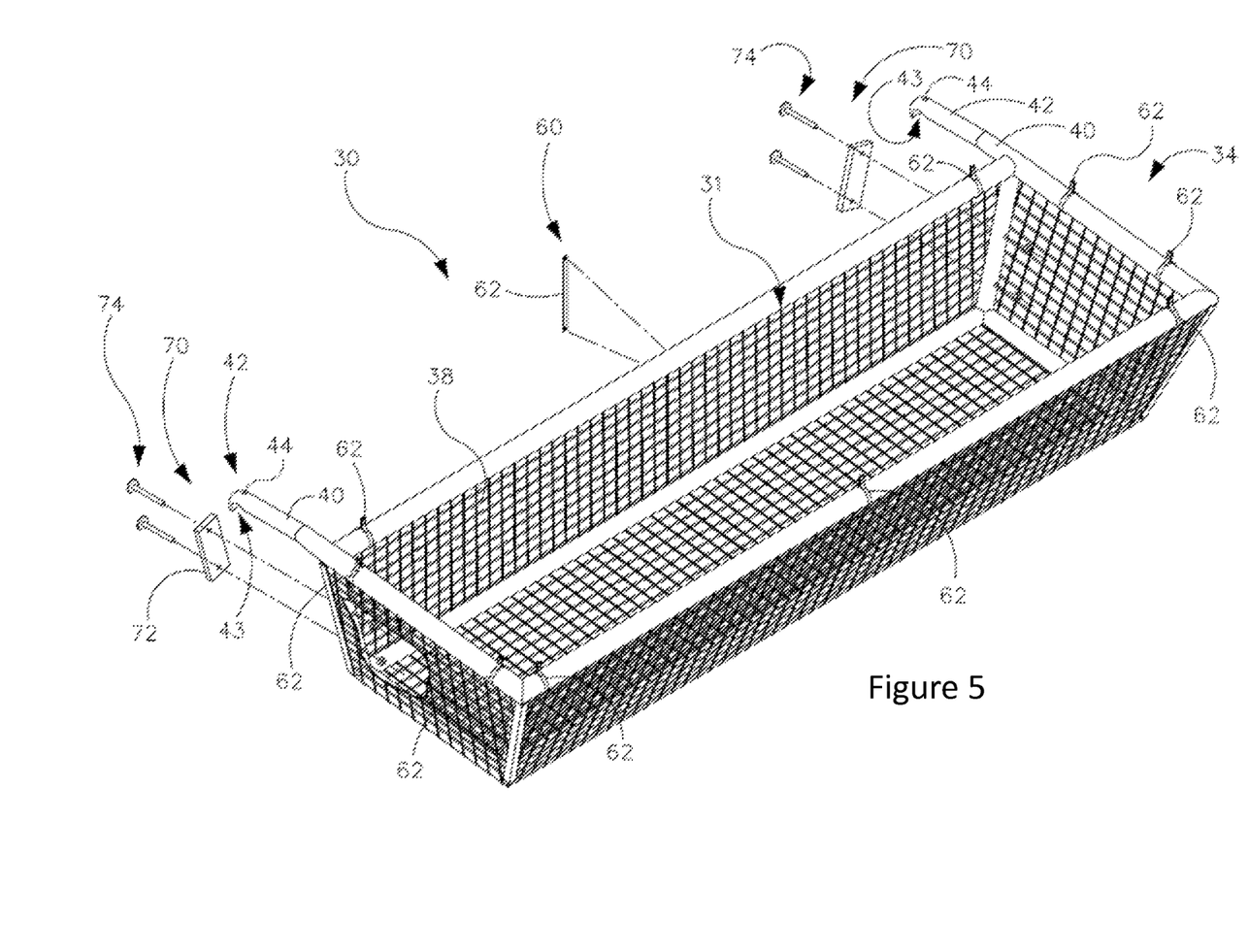
FIG. 5 is a partial exploded view illustrating a connector assembly and bumper assembly as disclosed in accordance with yet another embodiment of the present invention.

Referring now to the embodiment illustrated in FIG. 5, the present invention may also include a connector assembly 60 structured to removably connect the member 38 to the frame assembly 34. Particularly, the connector assembly 60, of at least one embodiment, comprises a plurality of connectors 62 removably attached to the receptacle member 38 and the frame assembly 34 in order to connect the receptacle member 38 to the frame assembly 34. Specifically, in one embodiment, the connectors 62 is structured to removably attach the member 36 to the frame assembly 34 in a manner such that the member 38 can be patched, fixed, or replaced, if needed or desired. As such, the connectors 62 of certain embodiments may include snaps, buttons, clips, zip ties, or other devices structured to facilitate the practice of the present invention in the intended manner.

Figure 4:
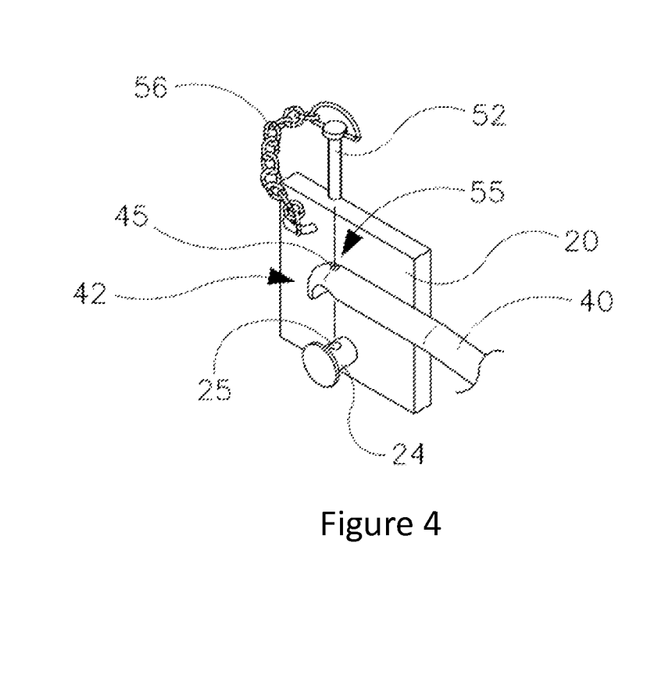
FIG. 4 is a close up, cut away, exploded view of the receptacle attachment member, vehicle attachment assembly and locking assembly as disclosed in accordance with at least one embodiment herein.

Further, still referring to FIG. 4, at least one embodiment comprises at least one bumper assembly 70 connected to a rear or truck-facing portion of the debris receptacle 30. Particularly, the bumper assembly 70 is structured and disposed to contact the rear portion of the truck 2, for example, at or near the truck's bumper, ledge or other piece proximate or below the tailgate 4. Accordingly, the bumper assembly 70 of at least one embodiment comprises a bumper member 72 which may be constructed of a generally soft, flexible or cushioned material structured to prevent or minimize damage to the vehicle 2 or frame assembly 34. The bumper member 72 may be connected to the rear or truck-facing portion of the receptacle 30 via one or more attachment or connecting devices 74 such as, for example, screws, bolts, etc. Other embodiments may use adhesive or other connection methods as desired. It should also be noted that the rear or truck-facing frame members 36' may be constructed of a soft or cushioned material, rather than including a separate bumper assembly 70.

This written description provides an illustrative explanation and/or account of the present invention. It may be possible to deliver equivalent benefits and insights using variations of the sequence, steps, specific embodiments and methods, without departing from the inventive concept. This description and these drawings, therefore, are to be regarded as illustrative and not restrictive.

Now that the invention has been described,

What is claimed is:

1. A tailgate debris catching assembly for a vehicle, comprising:
    at least one vehicle attachment assembly securely attached to a portion of the vehicle,
    a debris receptacle comprising an open top portion and an inner receiving area, wherein said inner receiving area of said debris receptacle is structured to receive and at least temporarily retain debris falling from the vehicle and through said open top portion of said debris receptacle,
    said debris receptacle further comprising at least one receptacle attachment member, said receptacle attachment member being securely and removably attached to said vehicle attachment assembly,
    said vehicle attachment assembly comprising at least one attachment device disposed in an attached, fitted engagement with said receptacle attachment member, said attachment device comprising at least one protruding member extending away from the vehicle,
    said receptacle attachment member comprising an engagement portion cooperatively structured for a fitted engagement with said at least one protruding member of said vehicle attachment assembly,
    said vehicle attachment assembly comprising a locking assembly disposable in a removable locking engagement with said receptacle attachment member, and
    wherein an end portion of said receptacle attachment member and said at least one protruding member of said vehicle attachment assembly comprise holes disposable in an aligned relation to one another to create a locking channel.

2. The tailgate debris catching assembly as recited in claim 1 wherein said engagement portion of said receptacle attachment member comprises a receiving portion configured to fittingly receiving said at least one protruding member therein.

3. The tailgate debris catching assembly as recited in claim 1 wherein said locking assembly is structured to lockingly engage said end portion of said receptacle attachment member to said at least one protruding member of said vehicle attachment assembly.

4. The tailgate debris catching assembly as recited in claim 1 wherein said locking assembly comprises at least one locking member disposable at least partially within said locking channel to lockingly engage said receptacle attachment member and said vehicle attachment assembly to one another.

5. The tailgate debris catching assembly as recited in claim 4 wherein said locking assembly comprises a plurality of at least two spaced apart locking members disposable at least partially within corresponding spaced apart locking channels of a single receptacle attachment member and vehicle attachment assembly pair.

6. The tailgate debris catching assembly as recited in claim 1 wherein said debris receptacle comprises a frame assembly and at least one receptacle member connected to said frame assembly to create said inner receiving area and said open top portion thereof.

7. The tailgate debris catching assembly as recited in claim 6 wherein said receptacle member comprises a mesh material.

8. The tailgate debris catching assembly as recited in claim 6 further comprising a plurality of connectors removably attached to said receptacle member and said frame assembly to dispose said receptacle member in a removably connected relation with said frame assembly.

9. The tailgate debris catching assembly as recited in claim 1 further comprising at least one bumper connected to a rear portion of said debris receptacle, wherein said at least one bumper is structured to contact a rear portion of the vehicle.

10. The tailgate debris catching assembly as recited in claim 1 wherein said open top portion of said debris receptacle is operatively disposed below a bottom opening of the tailgate portion of a dump truck.

11. A tailgate debris catching assembly for a dump truck, comprising:
    a plurality of at least two vehicle attachment assemblies securely attached to opposite ends of a rear portion of the dump truck,
    a debris receptacle comprising an open top portion and an inner receiving area, said open top portion being operatively disposed proximate a lower portion of the dump truck tailgate, wherein said inner receiving area of said debris receptacle is structured to receive and at least temporarily retain debris falling from the dump truck and through said open top portion of said debris receptacle, said debris receptacle further comprising a frame assembly and at least one receptacle member connected to said frame assembly to create said inner receiving area and said open top portion thereof, a plurality of connectors removably attached to said frame assembly and said receptacle member to dispose said receptacle member in a removably connected relation to said frame assembly, said debris receptacle further comprising a plurality of at least two receptacle attachment members, said receptacle attachment members being securely and removably attached to said vehicle attachment assemblies, said receptacle attachment members each comprising an end portion cooperatively structured for a fitted engagement with a corresponding one of said plurality of vehicle attachment assemblies, said end portions and said vehicle attachment assemblies comprising holes disposable in an aligned relation to one another to create a locking channel, and at least two locking assemblies removably disposed at least partially within said locking channels to lockingly engage said end portions of said receptacle attachment members and said vehicle attachment members.

12. The tailgate debris catching assembly as recited in claim 11 further comprising at least one bumper connected to a rear portion of said debris receptacle and structured to contact a rear portion of the dump truck.

13. A tailgate debris catching assembly for a vehicle, comprising:

at least one vehicle attachment assembly securely attached to a portion of the vehicle, a debris receptacle comprising an open top portion and an inner receiving area, wherein said inner receiving area of said debris receptacle is structured to receive and at least temporarily retain debris falling from the vehicle and through said open top portion of said debris receptacle, said debris receptacle comprising a frame assembly and at least one receptacle member connected to said frame assembly to create said inner receiving area and said open top portion thereof, a plurality of connectors removably attached to said receptacle member and said frame assembly to dispose said receptacle member in a removably connected relation with said frame assembly, and said debris receptacle further comprising at least one receptacle attachment member, said receptacle attachment member being securely and removably attached to said vehicle attachment assembly.

* * * * *